United States Patent
Fry et al.

(10) Patent No.: US 6,230,227 B1
(45) Date of Patent: May 8, 2001

(54) COMPUTER SYSTEM WITH SUPPORT FOR A SUBTRACTIVE AGENT ON THE SECONDARY SIDE OF A PCI-TO-PCI BRIDGE

(75) Inventors: Walter G. Fry; Todd J. Deschepper, both of Spring; James R. Reif, Houston, all of TX (US)

(73) Assignee: Compaq Computer Corp., Houston, TX (US)

( * ) Notice: Subject to any disclaimer, the term of this patent is extended or adjusted under 35 U.S.C. 154(b) by 0 days.

(21) Appl. No.: 09/209,939

(22) Filed: Dec. 11, 1998

(51) Int. Cl.$^7$ ........................................ G06F 13/00
(52) U.S. Cl. .................... 710/129; 710/126; 710/128
(58) Field of Search ........................ 710/129, 128, 710/126; 711/200, 202, 214, 217, 218

(56) References Cited

U.S. PATENT DOCUMENTS

| | | | |
|---|---|---|---|
| 5,588,125 | * 12/1996 | Bennett ................................. | 710/126 |
| 5,734,850 | * 3/1998 | Kenny et al. ......................... | 710/129 |
| 5,892,931 | * 4/1999 | Cohen et al. ......................... | 710/129 |
| 5,897,667 | * 4/1999 | Miller et al. ......................... | 711/218 |

OTHER PUBLICATIONS

*PCI Local Bus Specification, Product Version*, PCI Local Bus, Jun. 1, 1995, Revision 2.1, pp. 21–118.
*PCI to PCI Bridge Architecture Specification*, PCI Local Bus, Apr. 5, 1994, Revision 1.0, pp. i–65.

* cited by examiner

Primary Examiner—Ario Etienne
(74) Attorney, Agent, or Firm—Akin, Gump, Strauss, Hauer & Feld, L.L.P.

(57) ABSTRACT

A computer system for supporting a subtractive agent on a secondary PCI bus is provided. A bridge resides between a primary PCI bus and a secondary PCI bus. Where both a master device and a target device reside on the secondary PCI bus, the bridge employs one of two protocols to permit successful completion of the transaction. The protocol used depends upon the type of transaction sought by the master device. Once the subtractive agent is identified by address, the bridge keeps track of its location. Thus, further operations targeting the subtractive agent run without requiring either protocol to be used. Further, the need for a specialized signaling protocol to access the subtractive agent is avoided.

24 Claims, 7 Drawing Sheets

COMPUTER SYSTEM WITH SUPPORT FOR A SUBTRACTIVE AGENT ON THE SECONDARY SIDE OF A PCI-TO-PCI BRIDGE

BACKGROUND OF THE INVENTION

1. Field of the Invention

The invention relates to computer systems having PCI bus architecture and, more particularly, to supporting a subtractive agent on the secondary side of a PCI-to-PCI bridge in such systems.

2. Description of the Related Art

The peripheral component interconnect, or PCI, bus has been well received by computer system board designers since its introduction in 1992. The PCI bus is referred to as a mezzanine bus, or a local bus, because it usually has resided between the very high performance processor bus and the lower performance ISA or EISA bus.

As personal computer users demand ever increasing processing power, the PCI bus has allowed computational workload to be transferred from the central processing unit, or CPU, itself, to peripheral devices on the PCI bus. Increasingly, the computational workload has been transferred to masters. Masters, or initiators, initiate bus transactions while bus slaves, or targets, respond to a bus transaction initiated by a bus master. Oftentimes, an initiator is on one bus and a target is on a second bus. An agent is any entity or device that operates on a computer bus. An agent can be either a bus master or bus slave.

The PCI bus is by design limited to ten loads. A PCI device incorporated onto the motherboard is essentially one load and a PCI slot is considered two loads. For the needs of many computers, ten loads may be too limiting. So, many system boards contain multiple PCI buses. The logic that connects one computer bus to another is known as a bridge. The PCI-to-PCI bridge thus has a PCI bus on both sides of it. The PCI bus closer to the microprocessor, or CPU, is known as the primary PCI bus, or primary bus; the other PCI bus is known as the secondary PCI bus. When a transaction goes across the PCI-to-PCI bridge, the bus on which the master resides is a master bus and the bus on which the target resides is a target bus.

The PCI-to-PCI bridge therefore has two interfaces, a primary and a secondary interface. A master device or a target device can reside on either interface. Thus, for transactions where the master bus is different from the target bus, the PCI-to-PCI bridge functions as an intermediary, or go-between amid the master and target devices. First, it retrieves the transaction from the master on behalf of the target; second, it sends the transaction to the target on behalf of the master. From the perspective of the master, the PCI-to-PCI bridge is a target on the master bus on behalf of the target that resides on the target bus. Likewise, from the perspective of the target device, the PCI-to-PCI bridge is a master on the target bus on behalf of the master device that resides on the master bus.

The bridge provides a low latency path through which the processor may directly access PCI devices mapped anywhere in the memory or I/O address space of the computer system. The bridge maps the address space of one bus into the address space of another bus. The PCI bus defines three physical address spaces: memory, I/O space, and configuration space. Address decoding on the PCI bus is distributed; i.e. each device coupled to the PCI bus performs address decoding.

The PCI specification defines two styles of address decoding: positive and subtractive. Positive decoding is faster since each PCI device is looking for accesses in the address range(s) to which the device has been assigned. Subtractive decoding can be implemented by only one device on the PCI bus, since the subtractive decoding device accepts all accesses not positively decoded by some other agent.

Another aspect of positive decoding is inverse decoding (or mapping), which looks for accesses in the address ranges(s) that are not in the address assignments. For example, the PCI-to-PCI bridge is given an address map of the devices residing on the secondary PCI bus. When a cycle is initiated on the primary PCI bus, the PCI-to-PCI bridge performs a positive decode based on the address map. However, if the cycle is initiated on the secondary PCI bus, the PCI-to-PCI bridge performs a positive decode based on the inverse of the address map (that is, if the address is not on the map, then the bridge positively decodes the cycle).

More details on the PCI bus are found in Chapter 3 of the PCI Local Bus Specification, Production Version, Revision 2.1, dated Jun. 1, 1995, and the PCI-to-PCI Bridge Architecture Specification, Rev. 1.0, Apr. 5, 1994. Both documents are published by the PCI Special Interest Group of Hillsboro, Oreg. and are hereby incorporated by reference.

One way to configure a PCI bridge is to program its address map with the devices located on its secondary bus. Using this addressing scheme, a bridge positively decodes transactions occurring on the primary bus to determine if the destination of the transaction is to the secondary bus (across the bridge). The address map tells the bridge the address ranges in which the bridge is to forward transactions downstream from the primary to the secondary bus.

On a PCI bus, there are three speeds at which a device can positively decode addresses and claim a transaction as its own. "Fast" devices claim a transaction one clock after the address is placed on the bus; "medium" devices claim a transaction two clock cycles after; and "slow" devices claim the transaction after three clocks. Subtractive decoding can occur only when no device positively claims the transaction. Further, as noted, only one subtractive agent can be on a PCI bus.

The presence of subtractive agents on a PCI bus complicates the ability of the bridge to keep track of all agents on its secondary side. This is because of the way the address map of a bridge is created. When a computer is powered on, an operating system is loaded at the end of the boot process. The operating system creates the address map for each bridge in the system by determining the address allocation for each plug-and-play device that resides on the secondary side of the bridge. Subtractive agents typically are not allocated any address region until the device drivers coupled to them are loaded. Device drivers are not loaded until after the operating system is loaded. Thus, the address map of each bridge does not reflect the presence of a subtractive device.

A bridge itself may act as a subtractive agent, provided no other subtractive agents reside on its primary bus. As the bridge is the subtractive agent for the primary bus, a second subtractive agent can reside on the secondary bus. The bridge effectively assists the subtractive agent in claiming transactions intended for it from masters on the primary bus.

A problem arises, however, with subtractive agents on the secondary bus when a master, also on the secondary bus, initiates a transaction. Because of the addressing scheme described above, a bridge can erroneously claim a transaction initiated on the secondary bus (based on the inverse decode of the bridge address map) and forward it to the primary bus. The subtractive target on the secondary bus thus does not receive the intended transaction. This results in a master abort (since the transaction will not be claimed by any of the devices on the primary bus) and a system error.

One solution to this problem has been to only place subtractive devices on the primary PCI bus. Such a solution, however, is not feasible in a portable computer environment where the primary PCI bus is on the system board of the notebook computer itself and the secondary PCI bus is part of the docking station's hardware. Because the docking station supports an ISA bus, a subtractive agent between the PCI and ISA buses of the docking station needs to be maintained.

SUMMARY OF THE INVENTION

Briefly, the present invention provides a computer system that supports a subtractive agent, such as a PCI-to-ISA bridge, on the secondary side of a PCI-to-PCI bridge. The computer system includes two PCI buses, one on either side of the PCI-to-PCI bridge. A master device resides on the secondary side of the bridge, as does the target device, a subtractive agent.

When a transaction is initiated, the PCI-to-PCI bridge first determines the type of transaction by decoding the command byte on the master bus. Transactions are separated into two types by the bridge: posted transactions, where only memory writes are posted, and non-posted transactions. The PCI-to-PCI bridge then employs one protocol for posted transactions, a second protocol for non-posted transactions. Each protocol enables the master device on the secondary side of the PCI-to-PCI bridge to engage the subtractive agent, also on the secondary side.

Under the first protocol, used only for posted transactions, the PCI-to-PCI bridge claims the transaction from the master on the secondary PCI bus. The PCI-to-PCI bridge then acts as a target device by receiving the data into its own buffers. Next, the PCI-to-PCI bridge initiates the transaction on the primary PCI bus. After no target claims the transaction, the PCI-to-PCI bridge claims the transaction as a subtractive agent and redirects it to the secondary PCI bus. At this point, the PCI-to-PCI bridge acts as a master device to the subtractive agent target. The target on the secondary PCI bus responds as expected by claiming the transaction.

Under the second protocol, used for non-posted transactions, the PCI-to-PCI bridge retrieves the address, command, and data (if it is a write transaction) information without asserting the target ready signal (TRDY*). Instead, the PCI-to-PCI bridge issues a retry signal (STOP#), forcing the master to back off the transaction. The PCI-to-PCI bridge then forwards the transaction to the primary PCI bus for retrieval by a target. If no target responds, the transaction master aborts and the PCI-to-PCI bridge stores the address in a small cache. The master retries the transaction, and the PCI-to-PCI bridge compares the address to the one it stored in its small cache. At this point, the PCI-to-PCI bridge does not claim the transaction so the subtractive agent on the secondary PCI bridge can do so. (Note that the bridge always checks the cache, including the first time, even though the cache is empty).

Any subsequent transactions initiated on the secondary side of the bridge, including posted transactions, are not claimed by the PCI-to-PCI bridge if they match an address in the cache. Effectively, the subtractive agent is recognized by the bridge as if it was represented in the address map. The present invention avoids the need for a specialized signaling protocol to access the subtractive agent on the secondary bus.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
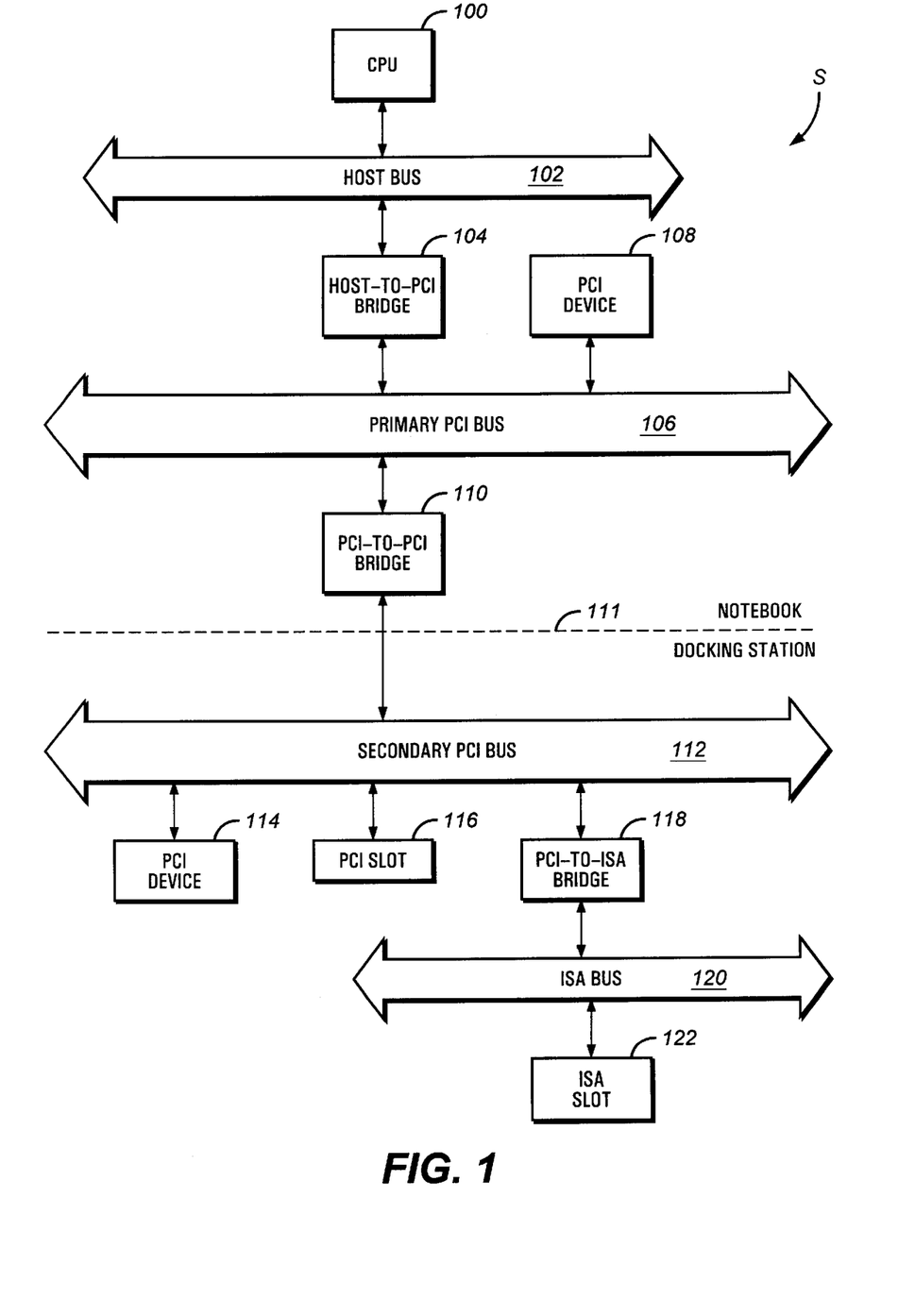
FIG. 1 is a block diagram illustrating a computer system according to the present invention.

Referring to the drawings, FIG. 1 shows a typical computer system S. Within the computer system S, a processor 100, also known as a central processing unit, or CPU 100, is shown. The CPU 100 may be a single microprocessor, such as Intel Corporation's 80486 or Pentium processors, or a more elaborate CPU system including multiple microprocessors, a cache controller, external co-processors, a level one (L1) cache, and other components, coupled to one another or to the host bus 102.

The CPU 100 is connected to a host bus 102, also known as a processor bus or high-speed local bus. The host bus 102 connects the processor 100 to the rest of the computer system S. Additional components such as memory controllers, memory DRAM, and cache controllers (not shown) may also reside on the host bus 102.

The host bus 102 is coupled to a primary PCI bus 106 via the host-to-PCI bridge 104. The host-to-PCI bridge 104 acts as a bridge between the host bus 102 and the primary PCI bus 106. Additionally, the host-to-PCI bridge 104 acts as a bus master, arbitrating between agents of computer system S that issue commands to one another. The host-to-PCI bridge 104 acts as a bus master and a target. The host-to-PCI bridge 104 does not necessarily perform the arbitration. Arbitration can instead be executed by a different device. For example, using chipset from Intel Corporation of Santa Clara, Calif., arbitration is done in the host bridge. Using a chipset from Compaq Computer Corporation of Houston, Tex., the arbitration is done in an ASIC which contains a number of core bridges, including the IDE bridge and ISA bridge.

Also attached to the primary PCI bus 106 is an additional PCI device 108. The PCI device 108 may be any number of computer components, such as a controller for a hard disk drive, a network card, or an audio device. Additional devices may be attached to the primary PCI bus as needed, up to the PCI limit of ten loads, as described above.

The computer system S also shows a secondary PCI bus 112, which is coupled to the primary PCI bus 106 via a PCI-to-PCI bridge 110. The PCI-to-PCI bridge 110 is used to extend the PCI bus over greater distances and to support a higher number of PCI devices than the ten load limit permits. Like the host-to-PCI bridge 104, the PCI-to-PCI bridge 110 acts as a bridge, this time between the primary PCI bus 106 and the secondary PCI bus 112. Additionally, the PCI-to-PCI bridge 110 acts as a bus master and a target on both sides of the bridge.

In this embodiment, the PCI-to-PCI bridge 110 acts also as a docking bridge between a notebook or laptop computer and a docking station, as denoted by a dotted line 111. This feature allows greater operating system flexibility in hot-plugging situations since all of the PCI devices within the docking station reside behind the PCI-to-PCI bridge 110.

The secondary PCI bus 112 is further coupled to a PCI device 114. Like PCI device 108, PCI device 114 may be one of many devices, including a SCSI controller, a video controller, or a modem interface. A PCI slot 116 is further coupled to secondary PCI bus 112 for accepting PCI expansion cards.

A PCI-to-ISA bridge 118 forms a bridge between the secondary PCI bus 112 and an ISA bus 120. The ISA bus 120 is coupled to an ISA slot 122 for accepting ISA expansion cards.

A brief explanation of the aspects of PCI transfers is provided for helping to understand the present invention. Every PCI transfer begins with an address phase, during which an address/data bus (AD[31:0]) transfers the address, and a command/byte enable (C/BE_[3:0]) bus transfers a command code. One or more data phases follows this phase, during which the same address/data bus transfers data and the command/byte enable bus transfers byte-enable signals. In a burst cycle, multiple data phases can follow a single address phase. In PCI terminology, the requesting PCI device is known as the initiator, and the addressed PCI device as the target. Every transfer starts with the activation of the frame (FRAME_) signal.

A device selection (DEVSEL#) signal is driven by the target to indicate that it is responding to the transaction. A device (this may include a bridge acting as a target) decodes the address/data lines and asserts a device select (DEVSEL#) signal if it owns the starting address. DEVSEL# may be driven with slow, medium or fast timing. If no agent asserts DEVSEL# within the slow timing parameters, the agent performing subtractive decoding may claim and assert DEVSEL#. The "# or "_ refers to active low signals.

The target device indicates its readiness with an active target ready (TRDY_) signal. An active TRDY_ during a write access indicates that the target can take the data from the address/data bus. An active TRDY_ during a read access indicates that the requested data is available on the address/data bus.

In addition, the initiator or master device also indicates its readiness to the PCI bridge, through an active initiator ready (IRDY_) signal. An active IRDY_ during a write access indicates that the master has sent the write data on the address/data bus. In a read access, an active IRDY_ indicates that it is ready to accept the data from the address/data bus. The master indicates that the transfer is completed with the following data transfer by deactivating the FRAME_ signal. The target can also stop the transfer by activation of a stop (STOP_) signal.

Upon powering up, a computer's operating system updates the address map of a bridge with devices located on its secondary bus. Thus, in the computer system S, the host-to-PCI bridge 104 has an address map of the devices located on its secondary bus, the primary PCI bus 106, which include PCI device 108 and the PCI-to-PCI bridge 110. The PCI-to-PCI bridge 110 has an address map of the devices located on its secondary bus, the secondary PCI bus 112, which include PCI device 114, PCI slot 116, and PCI-to-ISA bridge 118. However, because ISA devices are not made according to the PCI specification, the PCI-to-ISA bridge 118 does not have an address map of all devices located on its secondary side. Thus, the PCI-to-ISA bridge 118 is a subtractive device so that ISA devices can engage in transactions with other PCI devices in the system.

Figure 2A:
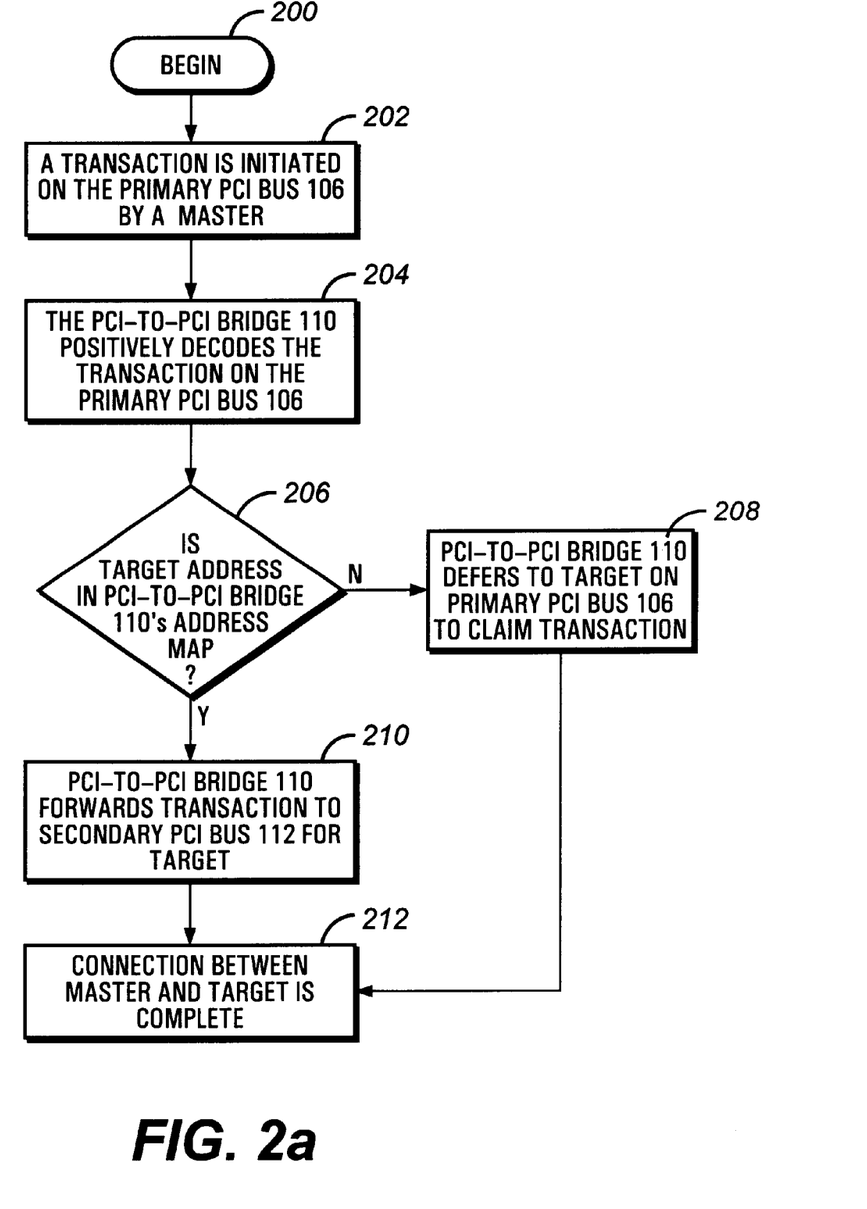
FIG. 2a is a flow diagram illustrating the steps taken by a prior art PCI-to-PCI bridge when a device on the primary PCI bus initiates a transaction and all devices on the secondary PCI bus are positively decoded devices.
Figure 2B:
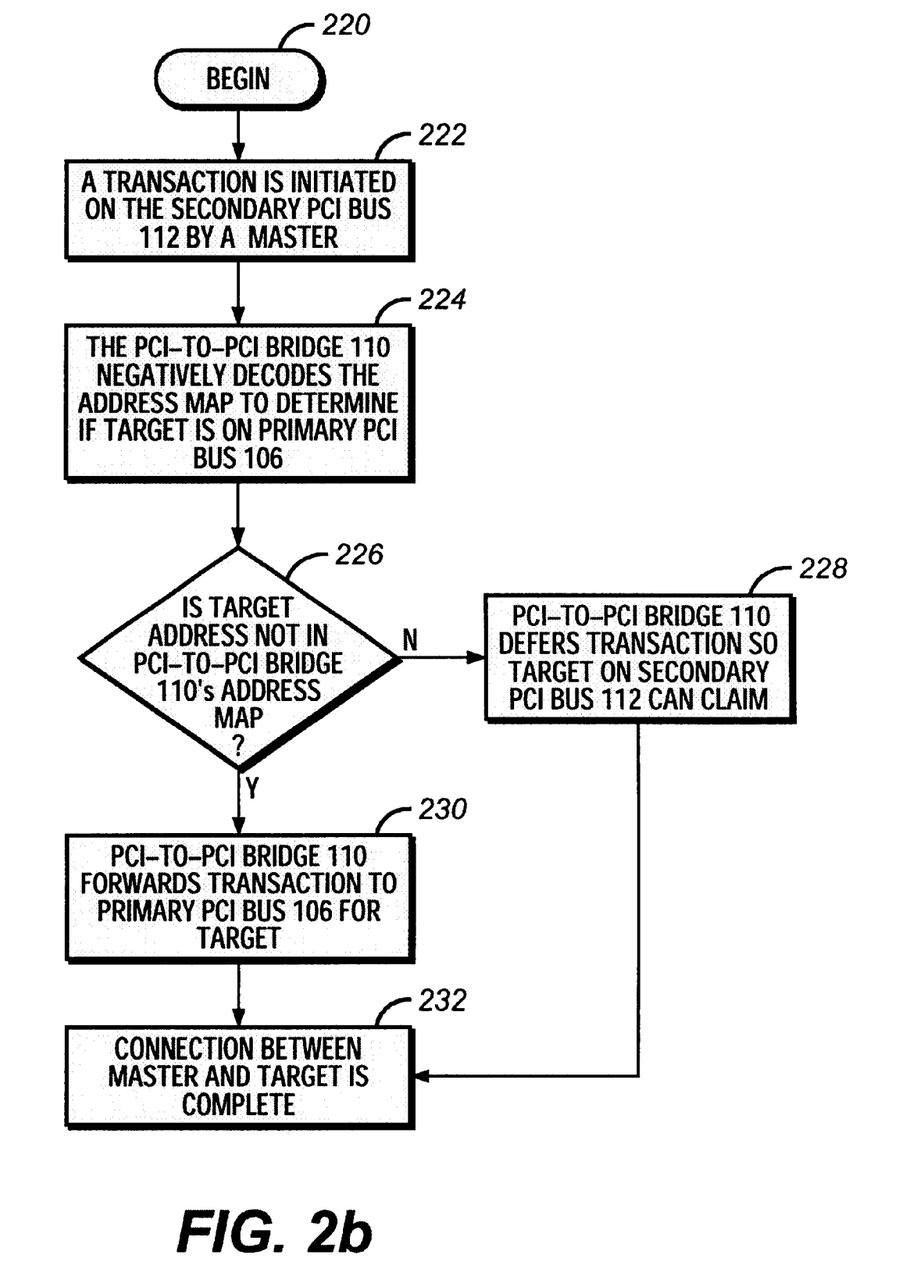
FIG. 2b is a flow diagram illustrating the steps taken by a prior art PCI-to-PCI bridge when a device on the secondary PCI bus initiates a transaction and all devices on the secondary PCI bus are positively decoded devices.
Figure 3A:
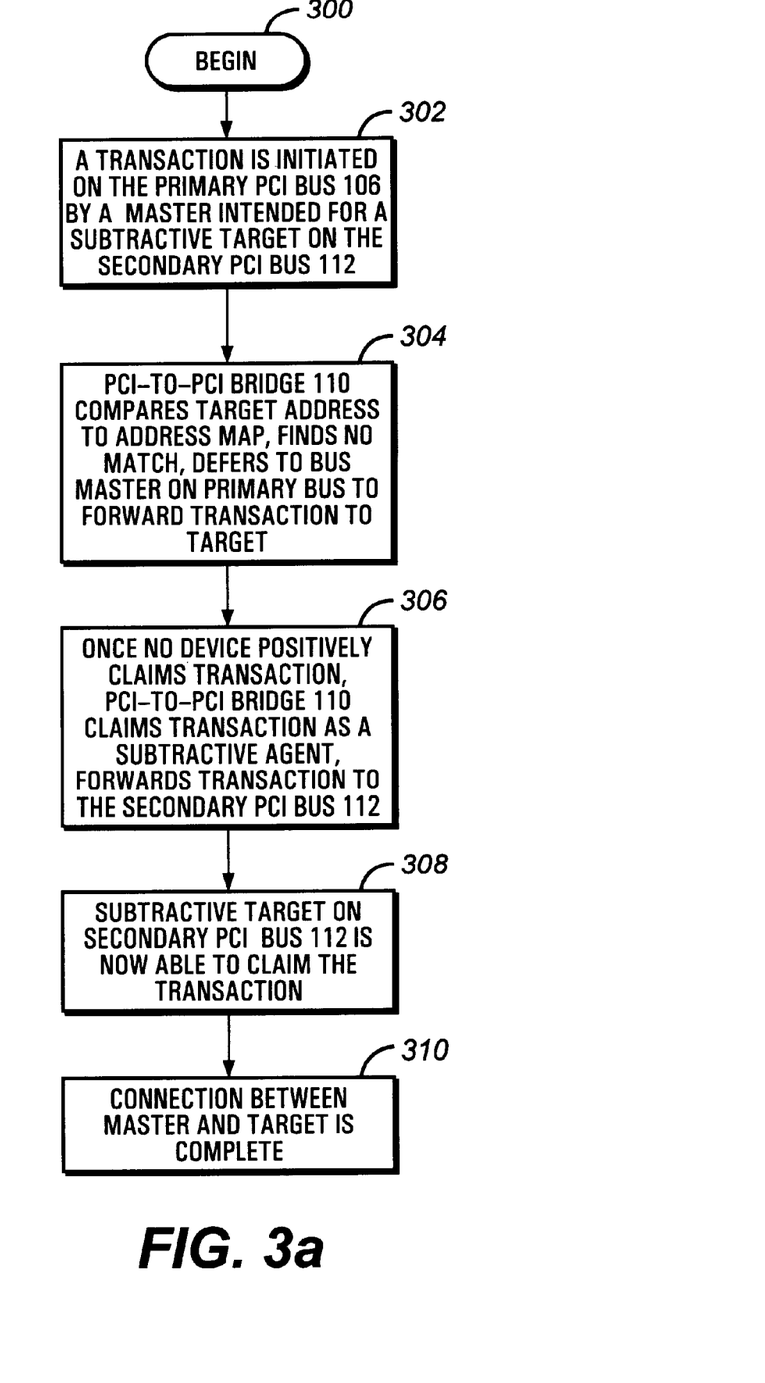
FIG. 3a is a flow diagram illustrating the steps taken by a prior art PCI-to-PCI bridge when a device on the primary PCI bus initiates a transaction and a device on the secondary PCI bus is a subtractively decoded device.
Figure 3B:
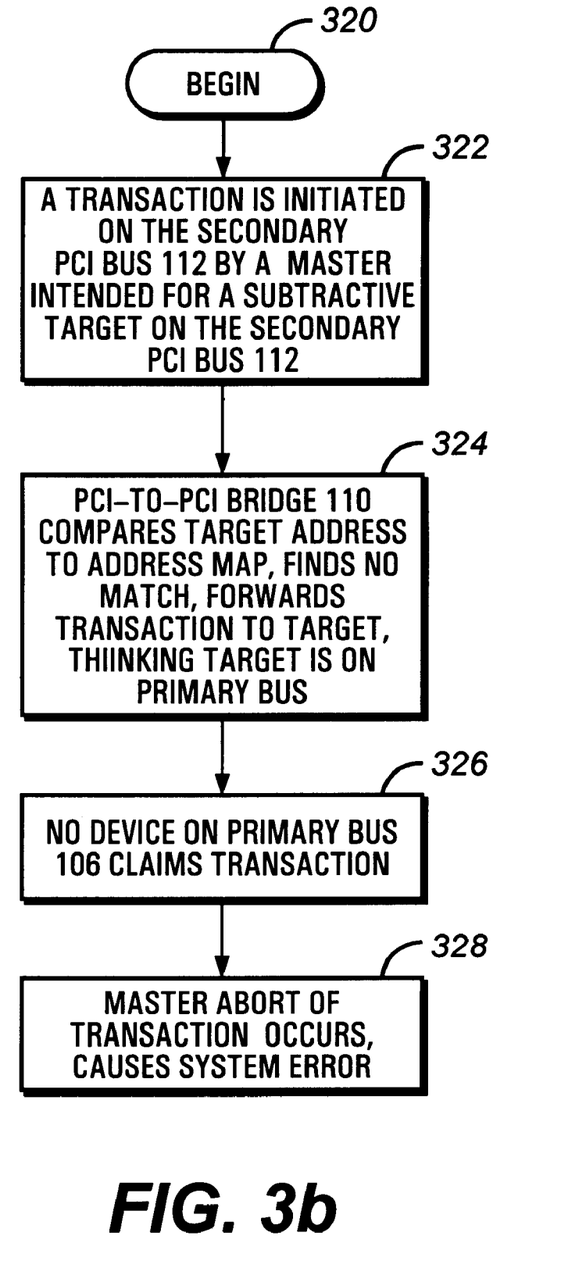
FIG. 3b is a flow diagram illustrating the steps taken by a prior art PCI-to-PCI bridge when a device on the secondary PCI bus initiates a transaction and a device on the secondary PCI bus is a subtractively decoded device.

FIGS. 2a, 2b, 3a, and 3b are flow diagrams that show how the PCI-to-PCI bridge 110 of FIG. 1 uses its address map to direct a transaction to the intended target. These four figures describe four different conditions. FIGS. 2a and 2b each show a condition that permits only positively decoded agents on the secondary PCI bus 112. In FIG. 2a, the master device is on the primary PCI bus 106. In FIG. 2b, the master device is on the secondary PCI bus 112. FIGS. 3a and 3b show a condition that takes place when a subtractive agent is on the secondary PCI bus 112. In FIG. 3a, the master device is on the primary PCI bus 106. In FIG. 3b, the master device is on the secondary PCI bus 112. FIG. 3b thus identifies the problem that is solved by this invention.

First, FIG. 2a illustrates how the PCI-to-PCI bridge 110 works under the first condition. A master device is located on the primary PCI bus 106 and only positively decoded agents are attached to the secondary PCI bus 112. The address map of PCI-to-PCI bridge 110 contains address information for PCI device 114, PCI slot 116, and PCI-to-ISA bridge 118 (FIG. 1).

The process of FIG. 2a begins at step 200. From there, a transaction is initiated on the primary PCI bus 106 by some device, an initiator of a transaction, or master, at step 202. The PCI-to-PCI bridge 110 must decide whether to forward the transaction to its secondary side. At step 204, the PCI-to-PCI bridge 110 positively decodes the transaction on the primary PCI bus 106 to determine if the target is located on the secondary PCI bus 112. At step 206, the PCI-to-PCI bridge 110 compares the target address and the address map of the PCI-to-PCI bridge 110.

If the target address is found in the address map of the PCI-to-PCI bridge 110, the PCI-to-PCI bridge 110 forwards the transaction to the secondary PCI bus 112 for the target device to receive, at step 210. This is known as a downstream transaction, or one in which the transaction moves away from the CPU. Otherwise, at step 208, the PCI-to-PCI bridge 110 defers to the target on the primary PCI bus 106 to claim the transaction. Because the target is not on the secondary PCI bus 112, no intervention by the PCI-to-PCI bridge 110 is necessary. In either case, the connection between the master and the target is complete at step 212. Thus, FIG. 2a demonstrates a successful transaction in which the master device is on the primary PCI bus 106 and all agents on the secondary bus 112 are positively decoded agents.

For transactions that are initiated by devices on the secondary side of the PCI-to-PCI bridge 110, the address map is inversely decoded by the bridge 110 to determine the address range of devices on the bridge's primary bus 106. For those addresses that are not in the address map of the PCI-to-PCI bridge 110, the bridge 110 forwards the transaction upstream (toward the CPU) from the secondary bus 112 to the primary bus 106.

FIG. 2b illustrates how the PCI-to-PCI bridge 110 works under a second condition. A transaction is initiated by a device on the secondary bus 112. As with FIG. 2a, all devices on the secondary bus 112 are positively decoded devices.

The process begins at step 220. A transaction is initiated on the secondary PCI bus 112 (FIG. 1) by a master device at step 222. Next at step 224, the PCI-to-PCI bridge 110 inversely decodes the address map to determine if the target is on the primary PCI bus 106. Inverse decoding means that if the target address is in the address map of the bridge 110, no upstream forwarding is necessary; otherwise, upstream forwarding to the primary bus 106 occurs.

At step 226, the PCI-to-PCI bridge 110 determines whether the target address is in its address map. If not, the PCI-to-PCI bridge 110 forwards the transaction to the primary PCI bus 106 for the target. Otherwise, control proceeds to step 228, where the PCI-to-PCI bridge 110 defers the transaction so the target on the secondary PCI bus 112 can claim the transaction. That is, no upstream transaction takes place because both the master and target devices reside on the secondary PCI bus 112. From either steps 228 or 230, control proceeds to step 232, where connection between the master and target devices is complete. Thus, FIG. 2b shows a successful transaction by a master on the secondary PCI bus 112 when all devices on the secondary PCI bus 112 are positively decoded.

FIG. 3a illustrates how the PCI-to-PCI bridge 110 works when a subtractive agent resides on the secondary bus 112. This time, a transaction initiated on the primary bus 106 is intended for a subtractive target on the secondary bus 112. For example, such a transaction occurs when the PCI-to-ISA bridge 118 is a subtractive device on the secondary PCI bus 112 and the PCI-to-PCI bridge 110 is a subtractive agent on the primary PCI bus 106.

The diagram begins at step 300. At step 302, a master device on the primary PCI bus 106 initiates a transaction intended for a subtractive agent on the secondary PCI bus 112. At step 304, the PCI-to-PCI bridge 110 compares the intended target address to its own address map and, since the address map contains only positively decoded agents on its secondary bus, finds no match. Thus, the PCI-to-PCI bridge 110 does not forward the transaction downstream to the secondary PCI bus 112. Instead, the PCI-to-PCI bridge 110 defers to the target to claim the transaction on the primary PCI bus 106.

Next, at step 306, the PCI-to-PCI bridge 110 waits three clock cycles, to permit positively decoded devices to claim the transaction. At the fourth clock cycle, the PCI-to-PCI bridge 110 claims the transaction as a subtractive agent, and forwards the transaction to the secondary PCI bus 112. At step 308, the subtractive target on the secondary PCI bus 112 now claims the transaction. At step 310, the connection between the master and target is complete. Thus, making the PCI-to-PCI bridge 110 a subtractive agent for the primary PCI bus 106 allows a subtractive agent residing on the secondary PCI bus 112 to claim a transaction.

The present invention solves a problem that would otherwise occur under a fourth condition. As has been noted, a subtractive agent on the secondary PCI bus 112 cannot claim a transaction when a master is also on the secondary PCI bus 112. FIG. 3b demonstrates how this problem occurs. The flow diagram begins at step 320. A master device located on the secondary PCI bus 112 initiates a transaction, in step 322. This transaction is intended for a subtractive target, also on the secondary PCI bus 112. However, at step 324, the PCI-to-PCI bridge 110 compares the target address to its address map, finds no match, and erroneously assumes that the target must be on the primary PCI bus 106. Therefore, it forwards the transaction to the ostensible target on the primary PCI bus 106.

However, the target is not on the primary PCI bus 106, but is a subtractive decode device on the secondary PCI bus 112. Therefore, as step 326 shows, no device on the primary PCI bus 106 claims the transaction. Since the transaction has been forwarded to the primary PCI bus 106, the subtractively decoded target on the secondary PCI bus 112 has no way to know it is being sought.

Thus, at step 328, the transaction is claimed by no device. A master abort of the transaction occurs, resulting in a system error for computer system S. In contrast to the events illustrated in FIG. 3a, a subtractive agent cannot successfully reside on the secondary PCI bus when the master also resides on the secondary PCI bus 112, as shown in FIG. 3b. This is because the prior art PCI-to-PCI bridge 110 erroneously claims the transaction for the primary PCI bus 106.

Typically, a PCI-to-ISA bridge 118, such as shown in FIG. 1, is a subtractive decode agent. In a portable computer environment such as the one illustrated in FIG. 1, it is not possible to move the PCI-to-ISA bridge 118 to the primary PCI bus 106, as the two are on distinct system boards. The present invention provides a solution to this problem.

The present invention provides a way for a master on the secondary PCI bus 112 to engage a subtractive agent target, also on the secondary PCI bus 112. According to the present invention, the PCI-to-PCI bridge 110 uses one of two protocols for successfully supporting transactions using this configuration. The first protocol (FIG. 4) is used only for posted write transactions. The second protocol (FIG. 5) is used for all other transactions. Using one of these two protocols, the PCI-to-PCI bridge 110 can properly interpret a transaction initiated by a master device on its secondary side that is intended for a subtractive target, also on the secondary side. Furthermore, all other transactions work properly using these protocols.

Under the first protocol, a transaction is initiated by a master device on the secondary side of the PCI-to-PCI bridge 110. The PCI-to-PCI bridge 110 claims the transaction from the master on the secondary PCI bus 112 because its address map does not contain the address of the target device. (For posted transactions, the PCI-to-PCI bridge 110 also checks the address in its small cache.) The PCI-to-PCI bridge 110 then acts as a target device by receiving the data into its own buffers. This makes the master device think the transaction is taking place with the proper target device. The details of this feature of the present invention are explained below with reference to FIG. 4.

Figure 4:
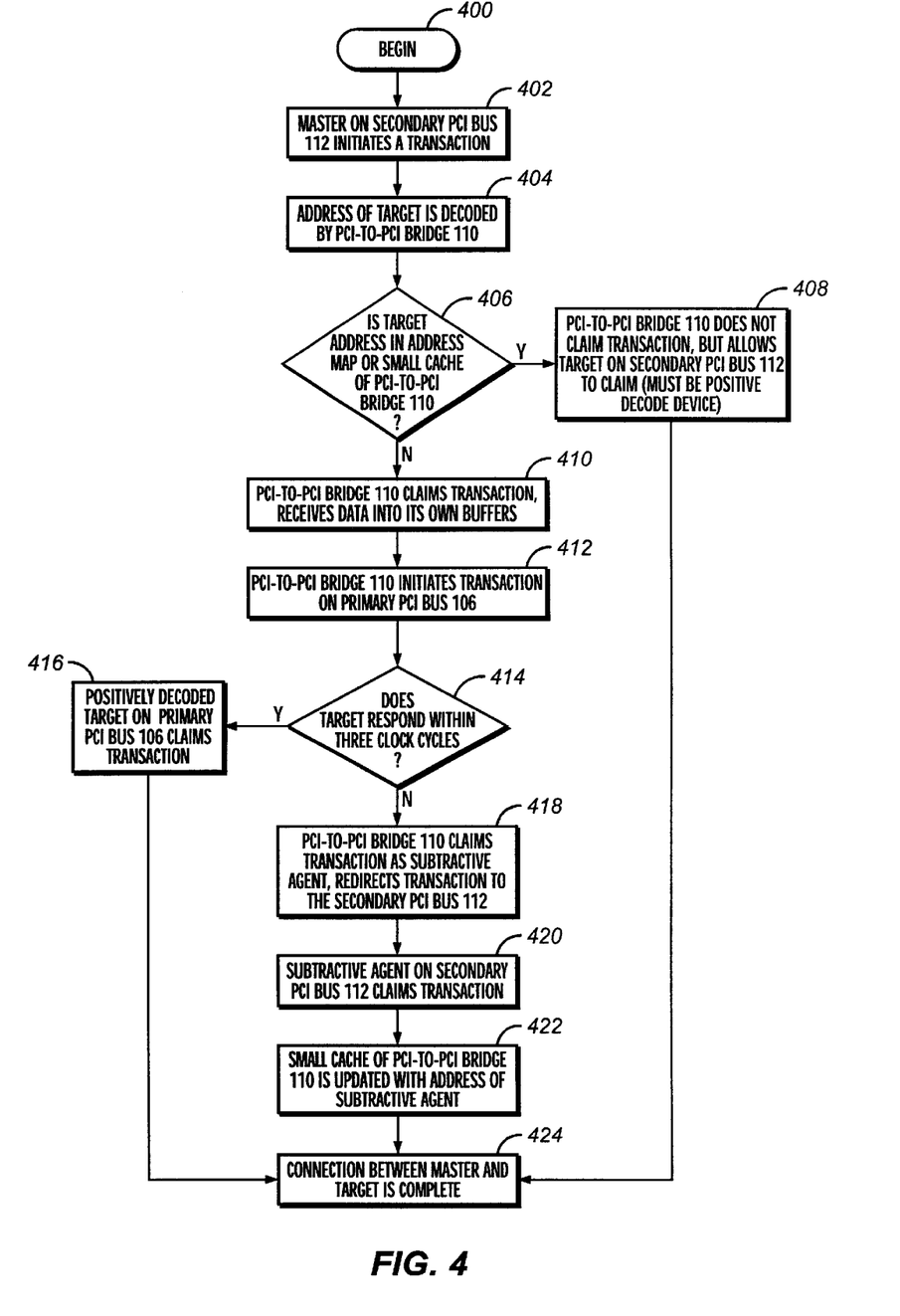
FIG. 4 is a flow diagram illustrating the steps taken by a PCI-to-PCI bridge according to the present invention used during posted write transactions.

The PCI-to-PCI bridge 110 then initiates the transaction on the primary PCI bus 106. If no target responds within three clock cycles (the slowest positively decoded device response time), the PCI-to-PCI bridge 110 then claims the transaction as a subtractive agent and redirects it to the secondary PCI bus 112. The PCI-to-PCI bridge 110, in effect, acts as a master device on the secondary bus. The target device on the secondary PCI bus 112 responds as expected by subtractively claiming the transaction.

FIG. 4 is a flow diagram illustrating the first protocol for computer system S of FIG. 1 according to the present invention. In contrast to FIGS. 2a, 2b, 3a, and 3b, no assumptions need be made in the process of FIG. 4 about whether the devices attached to either the primary PCI bus 106 or the secondary PCI bus 112 are positively or subtractively decoded. Any configuration is permissible for purposes of FIG. 4, subject only to the limitation that only one subtractively decoding device can reside on each bus.

The flow diagram begins at step 400. A device somewhere on the secondary PCI bus 112, a master, initiates a transaction at step 402. The address of the target is decoded by the PCI-to-PCI bridge 110 at step 404. Then, at step 406, a comparison between the target address and the address map of the PCI-to-PCI bridge 110 is made. As has been noted, the address map of the PCI-to-PCI bridge 110 contains the address decode for all positively decoded devices that reside on its secondary bus, which, in FIG. 1, is the secondary PCI bus 112.

If the target address is in the address map of the PCI-to-PCI bridge 110, control proceeds to step 408, where the PCI-to-PCI bridge 110 does not claim the transaction because the target is on the secondary PCI bus 112. Instead, the PCI-to-PCI bridge 110 allows the target on the secondary PCI bus 112 to claim the transaction. If, on the other hand, the target address is not in the address map of the PCI-to-PCI bridge 110 and the address is not within its small cache, control proceeds to step 410. There, the PCI-to-PCI bridge 110 acts as a target device by claiming the transaction and receiving the transaction data into its own buffers.

Control proceeds to step 412, where the PCI-to-PCI bridge 110 initiates a transaction on the primary PCI bus 106. At step 414, a determination is made whether the target responds within three clock cycles, as this is the latest time that a positively decoded target on the primary PCI bus 106 can respond. If so, control proceeds to step 416, where the positively decoded target on the primary PCI bus 106 claims the transaction. If, instead, no target responds within the allotted time, control proceeds to step 418, where the PCI-to-PCI bridge 110 claims the transaction as a subtractive agent. The PCI-to-PCI bridge 110 then redirects the transaction from the primary PCI bus 106 to the secondary PCI bus 112. This allows a subtractive agent on the secondary PCI bus 112 to claim the transaction, as indicated at step 420. Then, at step 422, the small cache of the PCI-to-PCI bridge 110 is updated with the address of the known subtractive agent.

From any of steps 408 (for positively decoded targets on the secondary PCI bus 112), 416 (for positively decoded targets on the primary PCI bus 106), or 422 (subtractively decoded targets on the secondary PCI bus 112), control proceeds to step 424. Here, a connection between master and target completes successfully. There is no path for subtractively decoded targets on the primary PCI bus 106 because the PCI-to-PCI bridge 110 itself must be a subtractive agent for this protocol to work. Each bus can have only one subtractive agent according to the PCI specification.

In the disclosed embodiment, the method demonstrated by FIG. 4 is used for posted writes. A posted write transaction is a memory write where the transaction is considered complete by the master, although it has not yet been completed by the target. Instead, the transaction has been taken by another device, in this case, the PCI-to-PCI bridge 110. Thus, it is the responsibility of the PCI-to-PCI bridge 110 to complete the transaction. The PCI-to-PCI bridge 110 contains data buffers for receiving the posted write data before it is forwarded to the target device. Also, the PCI-to-PCI bridge 110 must be initialized as a subtractive device, which is done by setting a bit in its configuration register.

Under the second protocol, the PCI-to-PCI bridge 110 claims, but does not complete, the transaction until the transaction has been claimed on the target bus. The details of this feature of the present invention are explained below with reference to FIG. 5. The PCI-to-PCI bridge 110 captures the address, command, and data (if it is a write transaction) information without asserting the target ready, or TRDY*, signal. The failure to assert TRDY* keeps the master from thinking the transaction is completed by any device. Then, the PCI-to-PCI bridge 110 issues the master retry, or STOP#, signal, which forces the master to terminate the transaction. This is known as "retrying the master" because it forces the master to retry the transaction at a later time.

Figure 5:
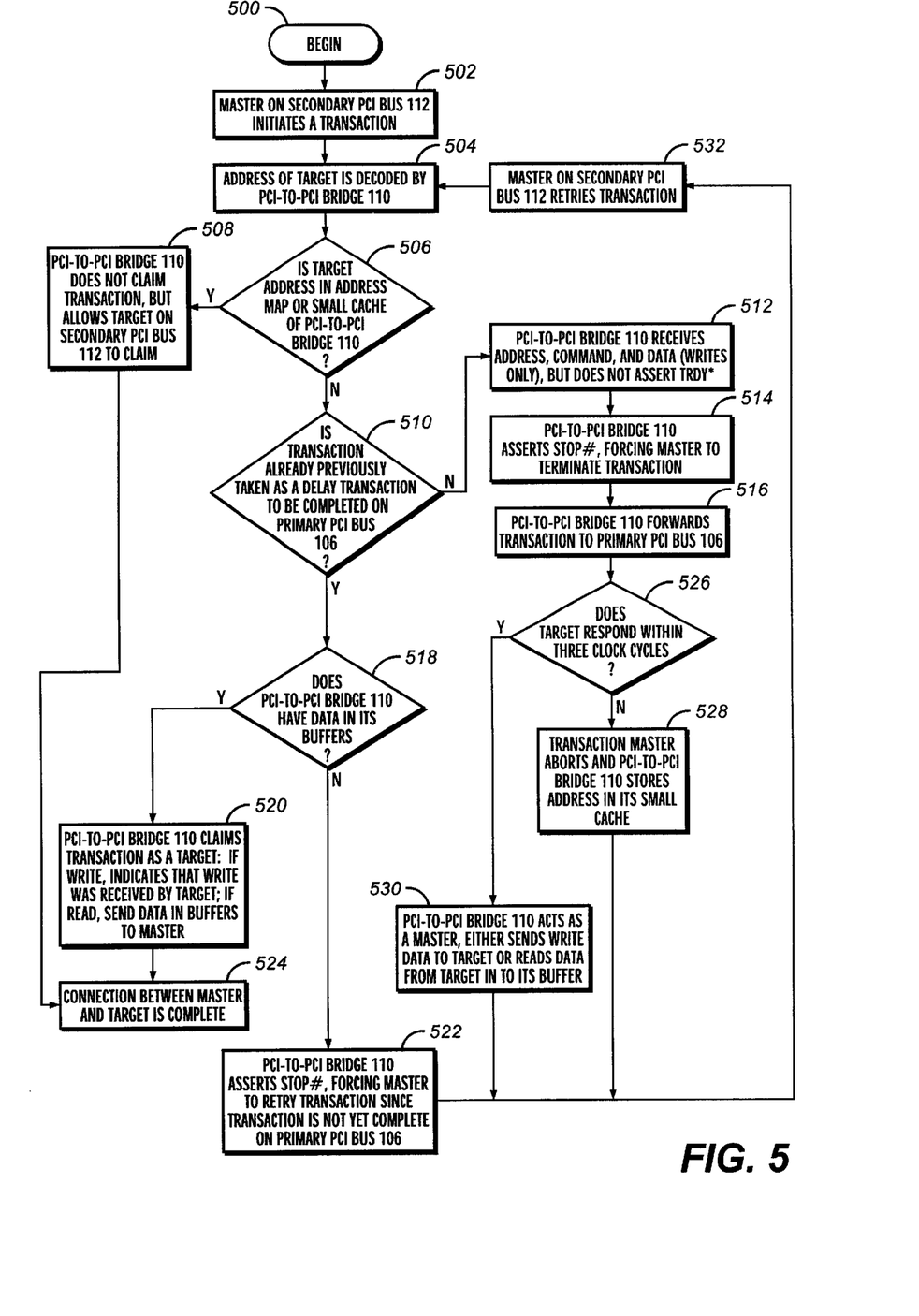
FIG. 5 is a flow diagram illustrating the steps taken by a PCI-to-PCI bridge according to the present invention used during all non-posted transactions.

The PCI-to-PCI bridge 110 then forwards the transaction (the one it received without the master knowing) to the primary PCI bus 106 for retrieval by a target device. After no target device responds within three clock cycles (the slowest positively decoded device response time), the transaction master aborts and the PCI-to-PCI bridge 110 stores the address in a small cache.

Upon receiving the address a second time, the PCI-to-PCI bridge 110 compares the address to the one it stored in its small cache (following the master abort on the primary PCI bus 106). The PCI-to-PCI bridge 110 sees that the target address is identical to the one stored in its cache. This time, the PCI-to-PCI bridge 110 does not forward the transaction to the primary PCI bus 106. Instead, the bridge does not claim the transaction so the subtractive agent on the secondary PCI bridge can do so. Furthermore, any subsequent transactions, including posted writes, that initiate on the secondary PCI bus that match the address in the cache will not be claimed by the bridge. The cache in this instance represents an extension of the address map containing addresses of the subtractive agent.

FIG. 5 demonstrates the second protocol of the invention in the form of a flow diagram controlling the operation of the computer system S of FIG. 1. Again, no assumptions need be made about whether the devices attached to either the primary PCI bus 106 or the secondary PCI bus 112 are positively or subtractively decoded. Any configuration is permissible for purposes of FIG. 5, subject only to the limitation that only one subtractively decoding device can reside on each bus.

The second protocol illustrated in FIG. 5 of the disclosed embodiment is used for delayed transactions, which includes delayed reads and writes, speculative transactions, and flow-through transactions. Delayed transactions are those that are received by the PCI-to-PCI bridge 110 where the target device issues STOP#, for example, when the target device is not ready to receive the transaction. As noted, the issuance of STOP# by the target device causes the master device to later retry the transaction.

Delayed writes are those transactions where the PCI-to-PCI bridge 110 captures the data without asserting TRDY*. Thus, the initiating master device does not know the data was retrieved and does not see the data as being transferred.

The flow diagram of FIG. 5 begins at step 500. A master device on the secondary PCI bus 112 initiates a transaction, at step 502. Then, at step 504, the address of the target device is decoded by the PCI-to-PCI bridge 110. At step 506, the PCI-to-PCI bridge 110 determines whether the target address matches either its address map or its small cache. If the address is in the address map, the target must be a positively decoded device on the secondary PCI bus 112. If the address is in its small cache, then the target must be a subtractive device on the secondary PCI bus 112. In either case, at step 508, the PCI-to-PCI bridge 110 does not claim the transaction. Instead, the PCI-to-PCI bridge 110 allows the target device on the secondary PCI bus 112 to claim the transaction, either as a positive or a subtractive agent.

If, instead, the target address does not match that in the address map of the PCI-to-PCI bridge 110 and is not in its small cache, control proceeds to step 510 where another inquiry is made. This time, a determination is made whether the transaction was already taken as a delay transaction to be completed on the primary PCI bus 106. If not, control proceeds to step 512, where the PCI-to-PCI bridge 110 receives the address, command, and data (only for write commands) information from the master and stores it in its buffer in a stealth-like fashion. This stealth is achieved by not asserting target ready, or TRDY*, as the master device expects when a transaction is claimed. Instead of the TRDY* signal, the PCI-to-PCI bridge 110, at step 514, asserts the master retry, or STOP#, signal, which forces the master to terminate the current transaction. Then, at step 516, the PCI-to-PCI bridge 110 forwards the transaction to the primary PCI bus 106.

Next, at step 526, a determination is made whether a response occurs within three clock cycles. As noted, this is the slowest time frame in which a positively decoded target claims a transaction, according to the PCI specification. If the target device is on the primary PCI bus 106, as shown in step 530, the PCI-to-PCI bridge 110 acts as a master device. For a write command, the PCI-to-PCI bridge 110 sends write data from its buffer (stored in the manner described in step 512) to the target device; for a read command, the PCI-to-PCI bridge 110 reads data from the target device into its buffer.

At step 526, if no target on the primary PCI bus 106 responds within three clock cycles, control proceeds to step 528, where the transaction master aborts. At this point, the PCI-to-PCI bridge 110 stores the address in a small cache area conventionally present as a part of the PCI-to-PCI bridge 110.

From either steps 528 or 530, the initiating master device eventually retries the same transaction as before, at step 532. This results from the submission of the STOP# signal by the PCI-to-PCI bridge 110 (described in step 514). The address of the target is next decoded by the PCI-to-PCI bridge 110, at step 504, and the process repeats itself from there.

If the response to the inquiry of step 510 is affirmative, control instead proceeds to step 518, where the PCI-to-PCI bridge 110 determines whether there is any data in its buffers (from the stealth operation of step 512). If so, in step 520, the PCI-to-PCI bridge 110 claims the transaction as a target device. This means that if a write command is issued, the PCI-to-PCI bridge 110 tells the master that the write was received by the target, because the PCI-to-PCI bridge 110 sent write data to the target. If a read command is issued, the PCI-to-PCI bridge 110 sends the data in its buffers (which the PCI-to-PCI bridge 110 received from the target) to the master. In either case, the PCI-to-PCI bridge 110, as a target device, is able to complete the transaction in step 520.

If the PCI-to-PCI bridge 110 instead has no data in its buffers in step 518, control proceeds to step 522. There, the PCI-to-PCI bridge 110 asserts the STOP# signal (just as in step 514), forcing the master to retry the transaction since the transaction is not yet complete on the primary PCI bus 106. Control proceeds to step 532 where the system waits for the master on the secondary PCI bus 112 to retry the transaction, starting the process again.

Completion of connection between master and target occurs in step 524. Completion between master and target occur whether the target is a positively or subtractively decoded device on the secondary PCI bus 112, a positively decoded device on the primary PCI bus 106, or when the target is unable to respond on the first attempt. The last situation may occur when the target is busy during initiation by the master.

Both the first and second protocols effectively extend the address map of the PCI-to-PCI bridge 110 by keeping the address of the subtractive agent in the small cache of the PCI-to-PCI bridge 110. After the first transaction in which the subtractive agent on the secondary bus 112 is a target, the PCI-to-PCI bridge 110 knows about the presence of the subtractive agent. Thus, for subsequent transactions in which the master device is on the secondary bus 112 and the target device is the subtractive agent, the PCI-to-PCI bridge 110 immediately knows not to claim the transaction for the primary bus 106.

Thus, the present invention uses these two protocols to allow a subtractively decoded agent to reside on a secondary PCI bus and successfully claim all transactions intended for it. The present invention determines which protocol to use based upon which type of transaction is sought. Posted write transactions, which are memory writes, employ the first protocol (FIG. 4); all other transactions employ the second protocol (FIG. 5). The type of transaction initiated by a master device can be determined by decoding the command byte, according to the PCI specification Revision 2.1, Section 3.1.1.

The present invention thus solves the problem of not being able to have a subtractive device on the secondary side of a PCI-to-PCI bridge. Furthermore, the present invention eliminates the need to use a specialized signaling protocol, known as sideband signaling, to access the subtractive device.

What is claimed is:

1. A method for supporting a subtractive agent as a target device on a computer system board, wherein the computer system board comprises:

a primary PCI bus;

a secondary PCI bus;

a master device coupled to the secondary PCI bus; and a bridge coupled between the primary PCI bus and the secondary PCI bus;

the method comprising:

determining whether a transaction initiated by the master device is a posted write transaction;

employing a first protocol to forward the transaction to the target device if the transaction is a posted write transaction;

employing a second protocol to forward the transaction to the target device if the transaction is not a posted write transaction; and if coupling the target device to the secondary PCI bus, claiming the transaction twice by the bridge.

2. The method of claim 1, wherein, under the first protocol, the bridge:

determines that the target device is not a positive agent on the secondary PCI bus;

determines that the target device is not a positive agent on the primary PCI bus;

claims the transaction as a subtractive agent on the primary PCI bus; and forwards the transaction to the target device on the secondary PCI bus.

3. The method of claim 1, wherein the bridge is capable of acting as a subtractive agent on the primary PCI bus.

4. The method of claim 3, wherein the bridge further comprises:

an address map comprising an address for each of the positive agents coupled to the secondary PCI bus;

a buffer for receiving data from a transaction; and a small cache for receiving an address of the subtractive agent.

5. The method of claim 1, wherein the bridge acts as a target for the master device coupled to the secondary PCI bus when the bridge claims the transaction the first time and acts as a master for the primary PCI bus when the bridge claims the transaction the second time.

6. A method for supporting a subtractive agent as a target device on a computer system board, wherein the computer system board comprises:

a primary PCI bus;

a secondary PCI bus;

a master device coupled to the secondary PCI bus; and a bridge coupled between the primary PCI bus and the secondary PCI bus;

the method comprising the steps of the bridge:

determining whether a transaction initiated by the master device is a posted write transaction;

employing a first protocol to forward the transaction to the target device if the transaction is a posted write transaction; and employing a second protocol to forward the transaction to the target device if the transaction is not a posted write transaction, wherein, under the second protocol, the bridge:

determines that the target device is not a positive agent on the secondary PCI bus;

claims the transaction without informing the master device;

terminates the transaction, forcing the master device to submit the transaction a second time;

forwards the transaction to the primary PCI bus;

determines that the target device is not a positive agent on the primary PCI bus;

saves the target address for the terminated transaction;

determines that the target address for the second transaction is identical to the target address saved;

claims the transaction as a subtractive agent on the primary PCI bus; and forwards the transaction to the target device on the secondary PCI bus.

7. The method of claim 6, wherein the bridge determines that the target device:

is not a positive agent on the secondary PCI bus by comparing an address of the target device to the addresses contained in the address map; and is not a positive agent on the primary PCI bus by permitting a response time for positive agents to expire.

8. A computer system for supporting a subtractive agent as a target device on a system board comprising:

a microprocessor;

a host bus coupled to the microprocessor;

a primary PCI bus;

a secondary PCI bus, wherein the subtractive agent is coupled to the secondary PCI bus;

a master device coupled to the secondary PCI bus; and a bridge coupled between the primary PCI bus and the secondary PCI bus, wherein the bridge is capable of acting as a subtractive agent on the primary PCI bus;

wherein a transaction is initiated by the master device, and the bridge employs either a first protocol or a second protocol for forwarding the transaction to the target device on the secondary PCI bus.

9. The computer system of claim 8, wherein, under the first protocol, the bridge:

determines that the target device is not a positive agent on the secondary PCI bus;

determines that the target device is not a positive agent on the primary PCI bus;

claims the transaction as a subtractive agent on the primary PCI bus; and forwards the transaction to the target device on the secondary PCI bus.

10. The computer system of claim 9, wherein the first protocol is employed when the transaction is a posted write transaction.

11. The computer system of claim 9, wherein the bridge comprises:

an address map comprising an address for each of the positive agents coupled to the secondary PCI bus;

a buffer for receiving data from a transaction; and a small cache for receiving an address of the subtractive agent.

12. The computer system of claim 11, wherein the bridge determines that the target device is not a positive agent on the primary PCI bus by permitting a response time for positive agents to expire.

13. The computer system of claim 8, wherein the second protocol is employed when the transaction is not a posted write transaction.

14. The computer system of claim 8, wherein no assumptions need be made in employing the first protocol of the second protocol about whether devices attached to either the primary PCI bus or the secondary PCI bus are positively or subtractively decoded, and wherein only one subtractively decoding device can reside on each of the primary PCI bus and the secondary PCI bus.

15. The computer system of claim 8, wherein the bridge is adapted to claim the transaction initiated by the master device twice for forwarding the transaction to the target device.

16. A computer system for supporting a subtractive agent as a target device on a system board comprising:

a microprocessor;

a host bus coupled to the microprocessor;

a primary PCI bus;

a secondary PCI bus, wherein the subtractive agent is coupled to the secondary PCI bus;

a master device coupled to the secondary PCI bus; and a bridge coupled between the primary PCI bus and the secondary PCI bus, wherein the bridge is capable of acting as a subtractive agent on the primary PCI bus;

wherein a transaction is initiated by the master device, and the bridge employs either a first protocol or a second protocol for forwarding the transaction to the target device on the secondary PCI bus, wherein, under the first protocol, the bridge:

determines that the target device is not a positive agent on the secondary PCI bus;

determines that the target device is not a positive agent on the primary PCI bus;

claims the transaction as a subtractive agent on the primary PCI bus; and forwards the transaction to the target device on the secondary PCI bus, wherein the bridge comprises:

an address map comprising an address for each of the positive agents coupled to the secondary PCI bus;

a buffer for receiving data from a transaction; and a small cache for receiving an address of the subtractive agent, and wherein the bridge determines that the target device is not a positive agent on the secondary PCI bus by comparing an address of the target device to the addresses contained in the address map.

17. A computer system for supporting a subtractive agent as a target device on a system board comprising:

a microprocessor;

a host bus coupled to the microprocessor;

a primary PCI bus;

a secondary PCI bus, wherein the subtractive agent is coupled to the secondary PCI bus;

a master device coupled to the secondary PCI bus; and a bridge coupled between the primary PCI bus and the secondary PCI bus, wherein the bridge is capable of acting as a subtractive agent on the primary PCI bus;

wherein a transaction is initiated by the master device, and the bridge employs either a first protocol or a second protocol for forwarding the transaction to the target device on the secondary PCI bus, wherein, under the second protocol, the bridge:

determines that the target device is not a positive agent on the secondary PCI bus;

claims the transaction without informing the master device;

terminates the transaction, forcing the master device to submit the transaction a second time;

forwards the transaction to the primary PCI bus;

determines that the target device is not a positive agent on the primary PCI bus;

saves the target address for the terminated transaction;

determines that the target address for the second transaction is identical to the target address saved;

claims the transaction as a subtractive agent on the primary PCI bus; and forwards the transaction to the target device on the secondary PCI bus.

18. The computer system of claim 17, wherein the bridge comprises:

an address map comprising an address for each of the positive agents coupled to the secondary PCI bus;

a buffer for receiving data from a transaction; and a small cache for receiving an address of the subtractive agent.

19. The computer system of claim 18, wherein the bridge determines that the target device is not a positive agent on the secondary PCI bus by comparing an address of the target device to the addresses contained in the address map.

20. The computer system of claim 18, wherein the bridge determines that the target device is not a positive agent on the primary PCI bus by permitting a response time for positive agents to expire.

21. A method for supporting a subtractive agent as a target device on a computer system board, wherein the computer system board comprises:

a primary PCI bus;

a secondary PCI bus;

a master device coupled to the secondary PCI bus; and a bridge coupled between the primary PCI bus and the secondary PCI bus;

the method comprising:

determining whether a transaction initiated by the master device is a posted write transaction;

employing a first protocol to forward the transaction to the target device if the transaction is a posted write transaction;

employing a second protocol to forward the transaction to the target device if the transaction is not a posted write transaction; and using one of the first protocol and the second protocol, interpreting the transaction intended for the target, also on the secondary PCI bus.

22. A computer system for supporting a subtractive agent as a target device on a system board comprising:

a microprocessor;

a host bus coupled to the microprocessor;

a primary PCI bus;

a secondary PCI bus, wherein the subtractive agent is coupled to the secondary PCI bus;

a master device coupled to the secondary PCI bus; and a bridge coupled between the primary PCI bus and the secondary PCI bus, wherein the bridge is capable of acting as a subtractive agent on the primary PCI bus; first protocol or a second protocol for forwarding the transaction to the target device on the secondary PCI bus, and wherein the bridge is adapted to interpret the transaction intended for the target, also on the secondary PCI bus.

23. A method for supporting a subtractive agent as a target device on a computer system board, wherein the computer system board comprises:

a primary PCI bus;

a secondary PCI bus;

a master device coupled to the secondary PCI bus; and a bridge coupled between the primary PCI bus and the secondary PCI bus;

the method comprising:

determining whether a transaction initiated by the master device is a posted write transaction;

employing a first protocol to forward the transaction to the target device if the transaction is a posted write transaction;

employing a second protocol to forward the transaction to the target device if the transaction is not a posted write transaction, and if the target device is coupled to the secondary PCI bus, passing the transaction twice through the bridge.

24. A computer system for supporting a subtractive agent as a target device on a system board comprising:

a microprocessor;

a host bus coupled to the microprocessor;

a primary PCI bus;

a secondary PCI bus, wherein the subtractive agent is coupled to the secondary PCI bus;

a master device coupled to the secondary PCI bus; and a bridge coupled between the primary PCI bus and the secondary PCI bus, wherein the bridge is capable of acting as a subtractive agent on the primary PCI bus;

wherein a transaction is initiated by the master device, and the bridge employs either a first protocol or a second protocol for forwarding the transaction to the target device on the secondary PCI bus, and wherein the transaction is passed twice through the bridge when the target device is coupled to the secondary PCI bus.

* * * * *

UNITED STATES PATENT AND TRADEMARK OFFICE
CERTIFICATE OF CORRECTION

PATENT NO. : 6,230,227 B1
DATED : May 8, 2001
INVENTOR(S) : Walter G. Fry et al.

It is certified that error appears in the above-identified patent and that said Letters Patent is hereby corrected as shown below:

Column 16,
Line 35, before "first protocol" insert -- wherein a transaction is initiated by the master device, and the bridge employs either a --.

Signed and Sealed this

Thirteenth Day of September, 2005

JON W. DUDAS
*Director of the United States Patent and Trademark Office*